United States Patent
de Oliveira et al.

(10) Patent No.: US 10,162,982 B2
(45) Date of Patent: Dec. 25, 2018

(54) END USER CONTROL OF PERSONAL DATA IN THE CLOUD

(71) Applicant: SAP SE, Walldorf (DE)

(72) Inventors: Anderson Santana de Oliveira, Antibes (FR); Michael Grifalconi, Antibes (FR)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 14/965,194

(22) Filed: Dec. 10, 2015

(65) Prior Publication Data

US 2017/0169249 A1    Jun. 15, 2017

(51) Int. Cl.
*H04L 29/06*    (2006.01)
*G06F 21/62*    (2013.01)

(52) U.S. Cl.
CPC .......... *G06F 21/6245* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 2004/0093334 A1* | 5/2004 | Scherer | G06F 21/6245 |
| 2006/0190564 A1* | 8/2006 | Arnold | H04L 67/306 |
| | | | 709/219 |
| 2007/0159309 A1* | 7/2007 | Ito | G16H 10/20 |
| | | | 340/425.5 |
| 2010/0010944 A1* | 1/2010 | Cheng | G06F 17/30032 |
| | | | 706/12 |
| 2012/0028609 A1* | 2/2012 | Hruska | G06Q 20/3674 |
| | | | 455/411 |
| 2013/0054803 A1* | 2/2013 | Shepard | G06F 21/6281 |
| | | | 709/225 |
| 2013/0054888 A1* | 2/2013 | Bhat | G06F 3/0604 |
| | | | 711/114 |

(Continued)

OTHER PUBLICATIONS

Niezen et al., "Cloud's Social Implications and the Need for Accountability by Individual Cloud Users," Social Sciences Research Network 2564478, Jul. 2014, retrieved from the Internet: URL<http://papers.ssrn.com/sol3/papers.cfm?abstract_id=2564478>. 21 pages.

(Continued)

*Primary Examiner* — Amir Mehrmanesh
(74) *Attorney, Agent, or Firm* — Fish & Richardson P.C.

(57) ABSTRACT

Implementations of the present disclosure include methods, systems, and computer-readable storage mediums for receiving, by an authorization manager of a cloud-platform, a request from an application, the request indicating a request to access personal user data stored in a database system of the cloud-platform, determining, by the authorization manager and based on user input from a user, that access to the personal user data is to be granted, and in response: providing, by the authorization manager, an access token to the application, receiving an access request from the application, the access request including the access token, and selectively providing the personal user data from a database container of the database system based on the access token, the database container being specific to the user.

20 Claims, 4 Drawing Sheets

(56) References Cited

U.S. PATENT DOCUMENTS

| | | | |
|---|---|---|---|
| 2013/0054889 A1* | 2/2013 | Vaghani | G06F 3/0604 711/114 |
| 2013/0097275 A1* | 4/2013 | Wofford, IV | G06F 3/0605 709/213 |
| 2014/0059647 A1* | 2/2014 | Immonen | H04L 63/102 726/3 |
| 2014/0109216 A1* | 4/2014 | Iversen | G06F 21/31 726/17 |
| 2014/0366080 A1* | 12/2014 | Gupta | H04L 63/0807 726/1 |
| 2015/0242605 A1* | 8/2015 | Du | G06F 21/32 726/7 |

OTHER PUBLICATIONS

Niezen et al., "Willingness to pay for accountability," Cloud Accountability Project, D:B-4.2 Final report on socio-economic context, Chapter 4, retrieved from the Internet:URL<http://www.a4cloud.eu/sites/default/files/D24.2%20Final%20report%20Socio-economic%20context.pdfhttp:/www.a4cloud.eu/sites/default/files/D24.2%20Final%20report%20Socio-economic%20context.pdf,%20>. p. 30.

'Google.com' [online]. "Using OAuth 2.0 to access Google APIs,"[retrieved Dec. 9, 2015]. Retrieved from the Internet: URL<https://developers.google.com/accounts/docs/OAuth2>. 10 pages.

'Microsoft.com' [online]. "Microsoft MSDN OAuth 2.0," [retrieved Dec. 9, 2012]. Retrieved from the Internet: URL<http://msdn.microsoft.com/en-us/library/live/hh243647.aspx>. 2 pages.

'Facebook.com' [online] "Facebook Authentication," [retrieved Dec. 9, 2012]. Retrieved from the Internet: URL<https://developers.facebook.com/docs/authentication/>. 2 pages.

Syer, "How to Integrate an Application with Cloud Foundry using OAuth2," Nov. 5, 2012, retrieved from the Internet: URL<http://blog.cloudfoundry.org/2012/11/05/how-to-integrate-an-application-with-cloud-foundry-using-oauth2/>. 3 pages.

'arkOS.com' [online] "What is arkOS?" retrieved Dec. 9, 2015]. Retrieved from the Internet: URL<https://arkos.io/what-is-arkos/>. 4 pages.

Peng Yu et al., "Automating Privacy Enforcement in Cloud Platforms," Data Privacy Management and Autonomous Spontaneous Security, Lecture Notes in Computer Science vol. 7731, 2013, pp. 160-173.

\* cited by examiner

END USER CONTROL OF PERSONAL DATA IN THE CLOUD

BACKGROUND

Misuse, hacking, and mass surveillance of personal data have damaged end-user trust in the cloud (e.g., generating, storing, and accessing data using remote servers). There have been numerous discussions about protecting personal data in the cloud. Further, the governmental regulations are under a process of change, imposing many more restrictions and requirements to enable user to exercise their rights with respect to control of their personal data. Leaks of photos (e.g., celebrity photos) from previously trusted cloud providers have contributed to the negative perception of loss of control and insecurity of one's personal data.

Accordingly, end-users are concerned about the security and privacy of their personal data. Furthermore, evidence has been gathered by recent surveys confirming end-user willingness to pay more for transparent cloud services. Such services offer guarantees and information about the nature of the personal data processing not currently offered by cloud providers.

SUMMARY

Implementations of the present disclosure include computer-implemented methods for user control of personal data in the cloud. In some implementations, methods include actions of receiving, by an authorization manager of a cloud-platform, a request from an application, the request indicating a request to access personal user data stored in a database system of the cloud-platform, determining, by the authorization manager and based on user input from a user, that access to the personal user data is to be granted, and in response: providing, by the authorization manager, an access token to the application, receiving an access request from the application, the access request including the access token, and selectively providing the personal user data from a database container of the database system based on the access token, the database container being specific to the user. Other implementations of this aspect include corresponding systems, apparatus, and computer programs, configured to perform the actions of the methods, encoded on computer storage devices.

These and other implementations may each optionally include one or more of the following features: the access token is based on a scope granted to the application by the user; the scope defines personal user data that the application is authorized to access; the application is executed by an application manager, which executes the application in an isolated operating system environment; the application is executed on a computing device of the user, and the access token is stored on the computing device; the application is provided read-only access to the personal user data; and the database system includes a plurality of containers, each container storing personal user data of a respective user.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
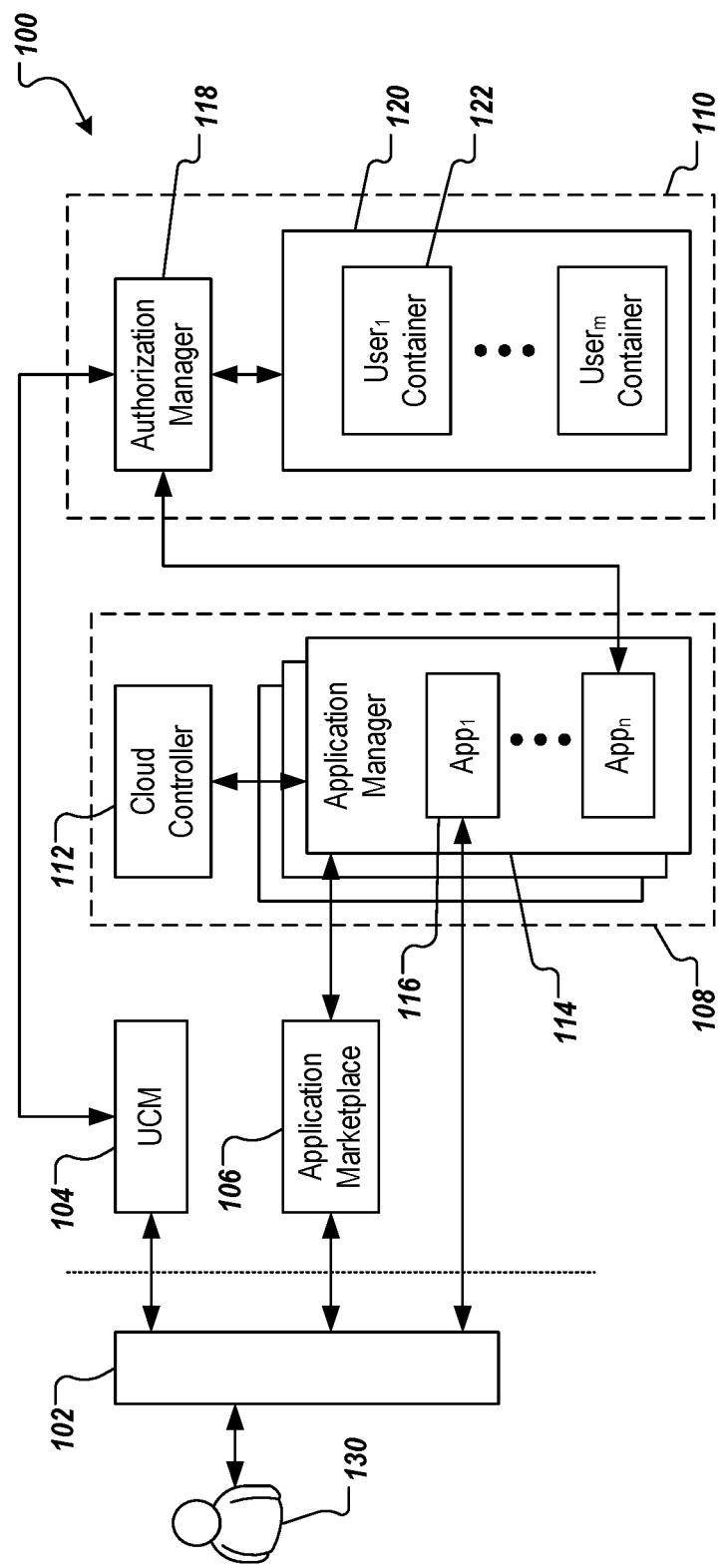
FIG. 1 depicts an example architecture in accordance with implementations of the present disclosure.

Implementations of the present disclosure are directed to a cloud-platform, which can be provided as a service, to enable user control of personal data in the cloud. More particularly, implementations of the present disclosure provide a cloud-platform that can be used by application developers to deploy their applications, and provides a plurality of multi-tenant database (MTDB) instances (each MTDB instance being specific to a user), which can be used to store personal data in a secure and isolated manner. In some examples, the number of MTDB instances can be scaled dynamically on demand.

As described in further detail herein, implementations of the present disclosure enable users to control who has access to their personal data, and still enables generation of aggregated values to the cloud-platform provider. More particularly, the cloud-platform of the present disclosure provides strong isolation of personal data in containers within a database system handled by the cloud-platform provider, as well a strong authentication and authorization mechanism built over existing standards (e.g., Open Authentication (OAuth)). In some examples, the cloud-platform provides trusted applications, which have limited access to personal data. In some examples, cloud-platform providers can benefit from the income this access may generate. In some examples, the cloud-platform presents advantages to application developers, who benefit from compliance certificates maintained by the cloud-platform provider. Further, the cloud-platform of the present disclosure, enables relatively simple implementation of privacy policies with relatively low cost from the perspective of application developers.

Implementations of the present disclosure employ an authorization protocol (e.g., OAuth) that enables services to act on behalf of users when interacting with other services. In this manner, sharing credentials (e.g., username, passwords) across services is avoided, which protects users from several threats (e.g., credentials being stored by one or more third-parties). For example, in traditional client-server architectures, the client (resource owner) uses its credentials to request protected resources held by the server. If a third-party wants to access these protected resources on behalf of the resource owner, the resource owner has to share its credentials with the third-party. This situation may lead to several undesired situations, such as, for example, the resource owner's credentials being stored in multiple storage (e.g., with the third-party), complete access to the protected resources (e.g., no limitation of rights to third-party), and/or difficulty of right revocation (e.g., the resource owner needs to change its credentials).

In some examples, OAuth mitigates these concerns by granting access to protected resources without the resource owner sharing credentials. More particularly, the OAuth protocol defines multiple roles: resource owner, resource server, client, and authorization server. In some examples, the resource owner is an entity (e.g., user) that holds protected assets (e.g., personal data). The resource owner is capable of granting access to the protected assets under its control. In some examples, the resource server is the server that hosts the resource owner's protected assets. In some examples, the client is the third-party entity that needs to access the protected assets on behalf of the resource owner. In some examples, the authorization server is the server that manages the authentication and authorization of the different entities involved.

In some examples, the general flow defined by the OAuth protocol is provided as:
1. The client must request the authorization to access the protected assets, which involves the resource owner, who has to grant the right to access its protected resources.
2. If the resource owner agrees, the client receives an authorization grant.
3. The client uses the authorization grant with the authorization server to request access to the protected resources.
4. The authorization server exchanges the authorization grant against an access token after the identity of the client has been established.
5. Using the access token, the client request access to the protected assets at the resource server.
6. If the access token is valid, the resource server grants the client access to the protected resources. Consequently, the client has access to protected assets without having access to the resource owner's credentials. As long as the access token remains valid, the client can access the protected resources.

As described in further detail herein, authorization protocols, such as OAuth, can be implemented in the cloud-platform of the present disclosure to support storage of personal data in a secure and isolated manner in accordance with implementations of the present disclosure.

FIG. 1 depicts an example cloud-platform architecture 100 in accordance with implementations of the present disclosure. The example architecture 100 includes a front-end 102, a user consent manager (UCM) 104, an application marketplace 106, an application host 108, and a database system 110. The application host 108 includes a cloud controller 112, a plurality of application managers 114, which respectively regulate execution of one or more applications 116 (e.g., App$_1$, . . . App$_n$). The database system 110 includes an authorization manager 118, a database 120, and a plurality of user-specific database containers 122. An example database system includes SAP HANA provided by SAP SE of Walldorf, Germany.

In some implementations, and as described in further detail herein, a user 130 interacts with the cloud-platform 100 through the front-end 102. For example, the front-end 102 can be provided as one or more computer-executable programs executed by a computing device, such as a client-side computing device (e.g., a desktop computer, a laptop computer, a tablet computing device, a smartphone). In some implementations, the server-side components are provided as one or more computer-executable programs executed by one or more computing devices, such as server-side computing devices. For example, the client-side computing device can communicate with server-side computing devices over a network (e.g., a local area network (LAN), a wide area network (WAN), the Internet, a cellular network, or any appropriate combination thereof). In some implementations, the database system 106 is provided by the one or more server-side computing devices (e.g., hosted databases).

In accordance with implementations of the present disclosure, and as described in further detail herein, the UCM 104 communicates with the front-end (e.g., a web browser executed on a desktop computer, a smartphone, tablet) using a secure channel (e.g., secure hypertext transfer protocol (HTTPS)) to establish approval for access needed by an application that the user 130 wishes to run. In some examples, the UCM 104 provides a dashboard display to the front-end 102, through which the user 130 can define access settings for applications (e.g., the applications 116 (App$_1$, . . . , App$_n$)). For example, the user 130 can use the dashboard to approve applications for access to the user's personal data (e.g., issue access tokens), and/or revoke access to the user's personal data (e.g., revoke previously issued access tokens).

In some implementations, the authorization manager 118 issues respective access tokens to applications that the end-user has agreed to grant access to particular sets of personal data. For example, each set of personal data is aligned with a respective token based on a scope provided by the authorization protocol (e.g., the OAuth scope). In some examples, the authorization manager 118 enforces access control using the access tokens.

In accordance with implementations of the present disclosure, each user (e.g., the user 130) is established as a database tenant in the database system 110. In some examples, the database system 110 implements isolation mechanisms to protect user data at the database-level. More particularly, the database system 110 provides a container (e.g., HDI container of the SAP HANA database system), within which a respective user's personal data resides. In other words, each container is a tenant database that is specific to a particular user. The containers share the same database system resources (e.g., memory, CPU Cores). However, each container is fully isolated with its own database users (e.g., applications), catalog, repository, persistence (e.g., data files, log files), and database services.

In some implementations, each container can correspond to a specific user and a specific schema, the schema being provided based on the scope authorized by the user. In this manner, there can be multiple containers for a respective user, each container corresponding to an application and/or scope authorized by the user. For example, the user can approve applications to access some scopes, preventing abusive personal data access for a given company or application, ensuring their data ownership.

In some implementations, and to enable coverage across multiple data processing scenarios, the database system 110 can be used in combination with non-SQL databases to store non-structured data in a more convenient manner. This can be particularly beneficial for processing data typically shared on social networks, for example. This would enable users to, for example, change a social network to another social network without needing to reclaim and import all their data into the new social network.

In some implementations, the application marketplace 106 enables users to browse applications that operate using the cloud-platform of the present disclosure. In some examples, the application marketplace 106 can be provided by the provider of the cloud-platform. In some examples, the application marketplace 106 can be provided as a third-party application marketplace (e.g., an "App Store"). In some implementations, applications from the application marketplace 106 declare (e.g., in a catalog broker) the data schema (scope) to which they require access (e.g., the OAuth scope that the application requires). Accordingly, and before interacting with and granting access to personal data, the user 130 is able to determine, which personal data the application would be granted access to.

In some implementations, the applications deployed in the cloud-platform can be audited to check conformance with policies and fairness of the data processing with respect the privacy policies in place. In some examples, this can be conducted as part of a certification process. For example, an audit can be performed to determine whether a particular application is transferring personal data to third-parties and under which conditions. In some examples, applications are allowed to transfer data to other applications and/or individuals using the authentication protocol, provided that the data owner (the user) has agreed to each individual transfer. In this manner, the application and the third-party providing it can benefit of further compliance certificates obtained by the cloud-platform provider.

In some implementations, applications cannot directly update or delete end-user's personal data. In some examples, applications do not have their own copy of the personal data, instead having read-only to the personal data (i.e., stored in the container of each user). In this manner, users do not need to perform data deletion requests to the applications they had granted data access to. Instead, the user only needs to revoke the access token released to that specific application using the UCM 104 provided by the cloud-platform.

In some examples, an application may need to keep some personal data in a cache for performance reasons. In such examples, the UCM will request the user to authorize an application to cache some data, after it is ensured (e.g., during the certification process) that the application follows particular guidelines. Example guidelines can include: keeping track of what personal data is cached; and providing an application programming interface (API) to the UCM 104 to allow the user to ask for the complete deletion of their personal data, without obliging the user to search through different applications web interfaces for such a deletion request.

In some implementations, in order to limit data loss in the case of vulnerable applications, implementations of the present disclosure provide multi-level access control. In some examples, the multi-level access control includes a token protection approach (e.g., if an application or end user device is compromised, an attacker would only have access to none, or part of the personal data of individuals who are users of that application). In some examples, access tokens are kept encrypted and stored at the user device (or inside the application), and are decrypted in memory when they need to be used with the password/authentication method used by the user. Because the user must present credentials (e.g., password) to log into the application, if an attacker (malicious user) gets access to the user's device, the attacker will have no means to use the existing tokens to gain access to personal data without knowing the user's password. This also offers protection in the case the application is vulnerable.

In some implementations, and in cases where less sensitive personal data is handled, or if the application needs to manage the data even when the user is not logged in, or yet for applications needing extremely high performance, access tokens can be provided in plaintext (i.e., unencrypted) to retrieve personal data from the database system 110. However, plaintext access tokens are transmitted through a secure channel (e.g., secure sockets layer (SSL)). In some examples, the access token can also be stored in an encrypted form with a key known by the application.

In some implementations, each application manager 114 stages and runs applications 116 in respective containers. Example application managers include droplet execution agents (DEAs) provided by The Cloud Foundry Foundation of San Francisco, Calif. With regard to staging applications, when a new application (or a new version of an application) is pushed to application host 106, the cloud controller 112 selects an application manager 114 from a set of available application managers to stage the application 116. The application manager 114 uses the appropriate buildpack to stage the application. With regard to running the application 116, the respective application manager manages the lifecycle of each application instance running in it, starting and stopping applications 116 upon request of the cloud controller 112. In some examples, the application manager 114 monitors the state of an application instance, and periodically broadcasts application state messages. In general, the application manager 114 provides isolated operating system environments to run the individual applications 116.

In some implementations, and with respect to emergency access (e.g., the user has lost their credentials), a sub-system can be provided to recover the main user credential for the UCM dashboard. In some examples, two-factor authentication is provided (e.g., text messaging, postal mail, phone call), such that there can be a recovery solution. There can be also a more difficult way to recover the account by contacting customer care and proving the identity documents, for example.

As described herein, implementations of the present disclosure enable personal user data to be grounded in scopes. In this manner, personal user data can be segmented with different access levels to mitigate issues with the concentration of personal user data. In some examples, particular combinations of personal user data can be more sensitive than others. For example, a credit card number combined with home address can be required by online shopping applications. In this example, and in accordance with implementations of the present disclosure, the authorization manager issues one-time access using an access token having a time-based validity (e.g., only valid for a short period of time). In another example, such as a chat application, to which the end-user can be connected for a long duration of time (e.g., hours), a longer duration access token can be provided (e.g., followed by a number of refresh tokens). Scopes can be assigned to distinct schemas in the container for each user, thereby offering increased security.

In some implementations, the application marketplace 106 can provide default scopes (e.g., with increasing security constraints). Example standard scopes and the respective personal data accessed by each can include:
  Public Scope: Name
  Identification Scope: Public Scope, Email Address
  Personal Scope: Identification Scope, Address, Telephone Number
  Financial Scope: Personal Scope, Bank Account Information and/or Credit Card Information In some implementations, the cloud-platform enables users to edit and create new scopes. Accordingly, scope can impose multiple authentication processes. For example, in order to grant access to the Identification Scope, the user can be asked to enter a personal identification number (PIN). However, to grant access to the financial scope, two-factor authentication can be required (e.g., a PIN and a passcode sent to the user by text message).

In accordance with implementations of the present disclosure, a user (e.g., the user 130) creates an account with the cloud-platform (e.g., subscribes to the cloud-platform, accepts terms of use, privacy policy and any further contractual terms). After the user has created an account, personal data of the user will start being collected (e.g., personal data the user submits as part of creating the account). Using their account, the user can execute applications that are available from the application marketplace (e.g., the application marketplace 106 of FIG. 1). In this manner, the user allows the applications to collect, process, and store personal data using cloud-platform of the present disclosure. Application developers publish applications to the application marketplace, each application declaring the required scopes in the application's privacy policy. The UCM presents the required scope information to the user, such that the user can know exactly which personal data is to be accessed by a given application.

In some implementations, during the application deployment process, the application marketplace acts as a service broker within the cloud-platform. In some examples, the application marketplace assigns specific database schemas to the application according to the declared scopes. In some examples, the schemas are created for each tenant (each user) inside the respective containers.

Figure 2:
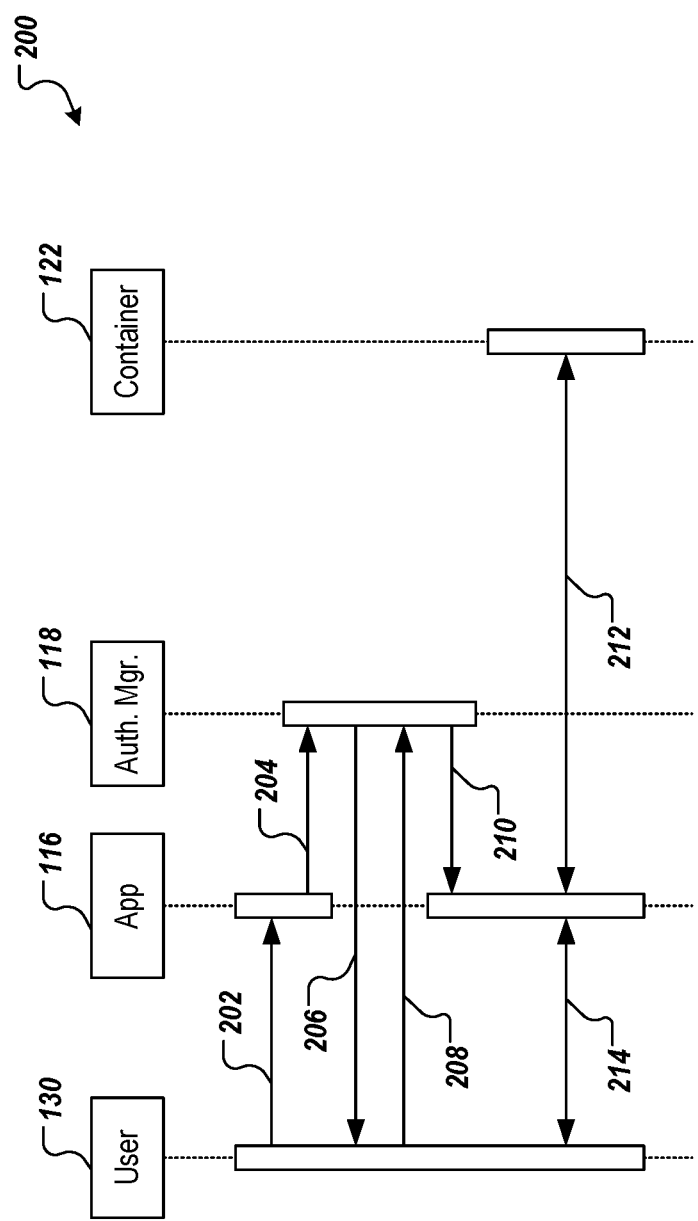
FIG. 2 depicts an example workflow diagram in accordance with implementations of the present disclosure.

FIG. 2 depicts an example workflow diagram 200 in accordance with implementations of the present disclosure. In some examples, the example workflow diagram 200 presupposes that the user 130 has already logged into the cloud-platform, and established a scope for an application 116. For example, the user 130 can use a computing device (e.g., smartphone) to download and install an application on the computing device, accept the terms of use required by the application, and authorizing the access to personal data scope(s) required by the application. The UCM 104 transmits the allowed scope(s) to the authorization manager 118.

In the depicted example, the user 130 transmits a request (202) to execute an application 116. The application 116 sends an authorization request (204) to the authorization manager 118 requesting access to personal data. In some examples, the authentication manager 118 sends an authorization request (206) to the user 130. In some examples, the user grants/denies the request to access the personal data. For example, and in response to the authorization request, the user 130 can enter a credential (or credentials), which are sent (208) to the authorization manager 118. The authorization manager 118 can check the authenticity of the credential(s) (e.g., compare the entered credential(s) to stored credential(s) of the user), and, if the credential(s) is/are authentic, the application 116 is granted access to the personal data (e.g., to the extent provided in an applicable scope). More particularly, the authorization manager 118 sends (210) an access token to the application 116. In some example, the access token limits access to personal data based on the scope). In some examples, the access token is provided based on an authentication protocol (e.g., OAuth). In some examples, the access token (e.g., encrypted access token) is stored on the computing device of the user 130 (e.g., the device, on which the application is executing). The user 130 interacts (214) with the application 116, and the application 116 executes requested functions. In some examples, execution of one or more functions requires the application 116 to access personal data. Consequently, the application 116 sends (212) a request for data to the user-specific container 122, the request including the access token, and the container (assuming the access token is still valid) provides (212) the requested data.

Implementations of the present disclosure enable the cloud-platform to support one or more monetization models. As one example, user monetization of personal data access is enabled. For example, users can receive compensation for granting access to a broader list of scopes for personal data. In some examples, the third-parties responsible for the applications can offer compensation to users, who agree to provide access to a broader scope of personal data. Example compensation can include money, discounts, and/or premium access to application features (e.g., in exchange for access to telephone numbers, contact lists, geographical locations, etc.). As another example, the cloud-platform provider can control advertisement display based on the personal data, or to provide a paid-premium service, which users can subscribe to avoid use of personal data for marketing purposes. As another example, the cloud-platform provider can conduct processing over anonymized personal user data to gain knowledge about user behavior that can be commercialized.

Figure 3:
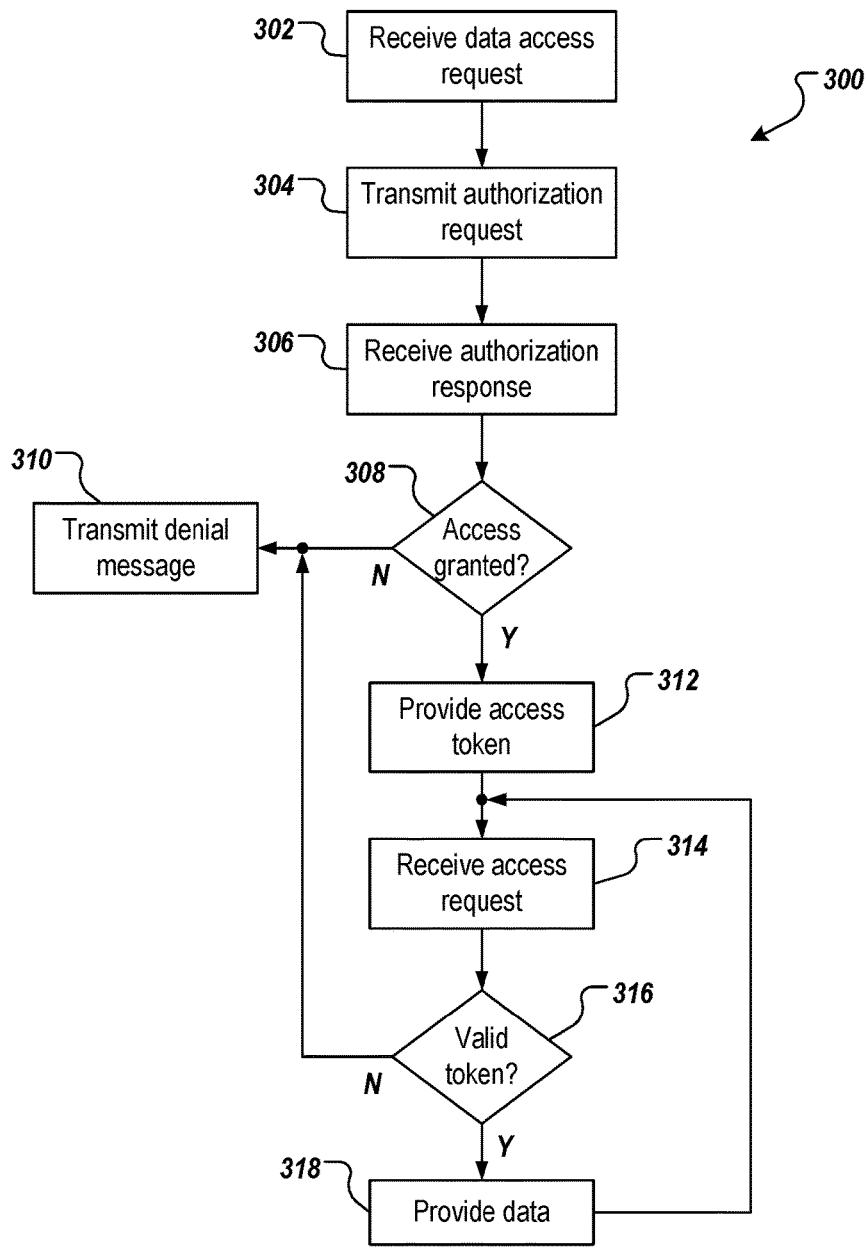
FIG. 3 depicts an example process that can be executed in accordance with implementations of the present disclosure.

FIG. 3 depicts an example process 300 that can be executed in accordance with implementations of the present disclosure. In some implementations, the example process 300 may be performed using one or more computer-executable programs executed using one or more computing devices. For example, the example process 300 can be provided by the example cloud-platform 100 of FIG. 1.

A request to access data is received (302). For example, an application transmits a request to access personal user data to an authorization manager, which receives the request. An authorization request is transmitted (304). For example, the authorization manager transmits the authorization request to a user, in response to the request to access personal user data. An authorization response is received (306). For example, the authorization manager receives an authorization response from the user. In some examples, the authorization response includes an indication that access to the personal user data is to be granted. In some examples, the authorization response includes one or more credentials that are to be checked as authentic before authorization is approved. In some examples, the authorization response include an indication that access to the personal user data is to be denied.

It is determined whether access has been granted (308). If access has not been granted, a denial message is transmitted (310). For example, the authorization manager transmits a denial message to the application indicating that access has been denied. If access has been granted, an access token is provided (312). For example, the authorization manager provides the access token to the application. In some examples, the access token is based on a scope that has been associated with the application. For example, if the scope includes the Public Scope, the access token only enables access to the name of the user. As another example, if the scope includes the Financial Scope, the access token enables access to the name, email address, street address, telephone number, and bank account information of the user.

An access request is received (314). For example, the application sends an access request to the database system, which receives the access request, the access request including the access token. It is determined whether the access token is valid (316). For example, the database system determines whether the access token is authentic and/or whether the access token has expired. If the access token is not valid, the denial message is transmitted (310). If the access token is valid, the personal user data corresponding to the scope of the access token is provided (318). For example, the database system transmits the personal user data to the application. In some examples, at least a portion of the example process 300 repeats (e.g., (314)→(316)→(318)) until the user logs out of the application and/or the access token is no longer valid (e.g., expires).

Figure 4:
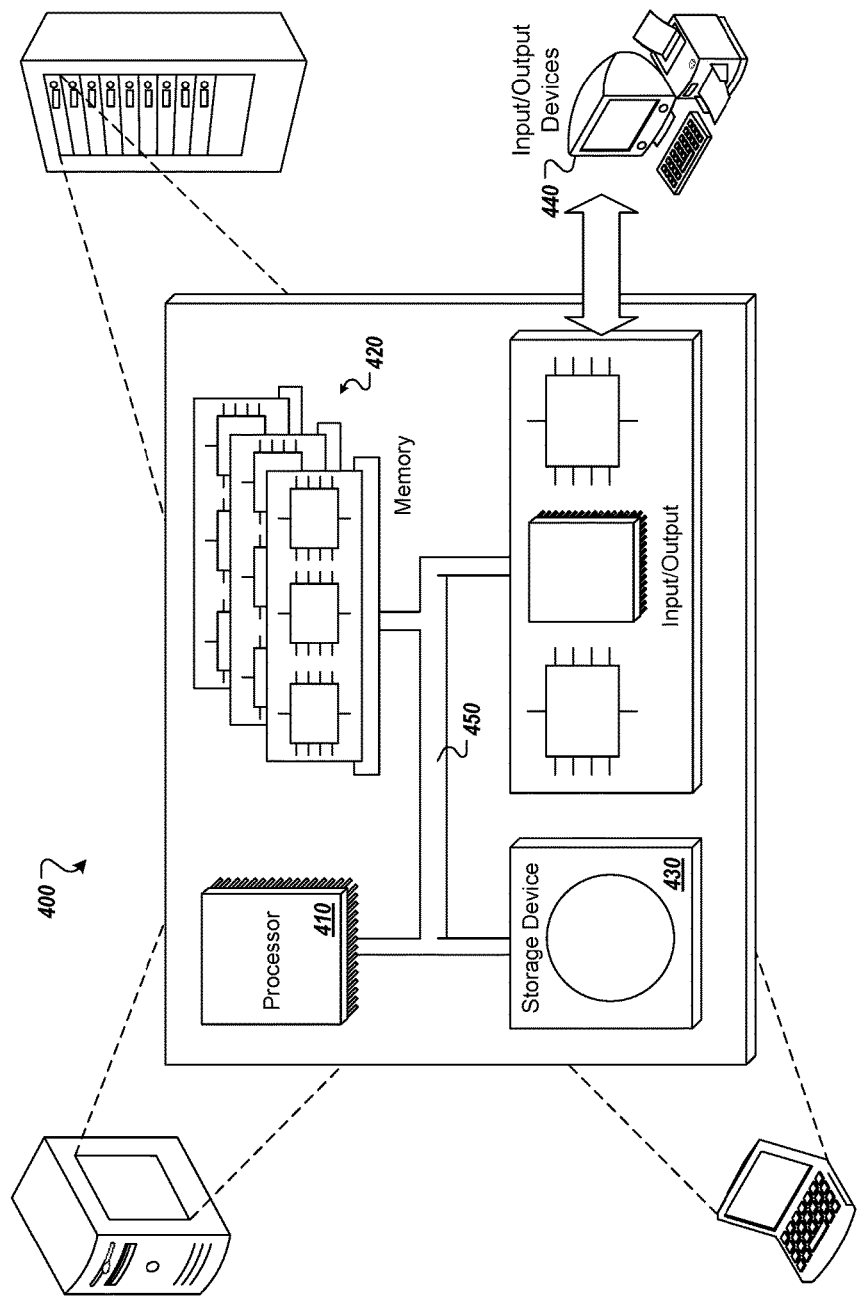
FIG. 4 is a schematic illustration of example computer systems that may be employed for implementations of the present disclosure.

FIG. 4 depicts a schematic diagram of an example computing system 400. The system 400 may be used to perform the operations described with regard to one or more implementations of the present disclosure. For example, the system 400 may be included in any or all of the server components, or other computing device(s), discussed herein. The system 400 may include one or more processors 410, one or more memories 420, one or more storage devices 430, and one or more input/output (I/O) devices 440. The components 410, 420, 430, 440 may be interconnected using a system bus 450.

The processor 410 may be configured to execute instructions within the system 400. The processor 410 may include a single-threaded processor or a multi-threaded processor. The processor 410 may be configured to execute or otherwise process instructions stored in one or both of the memory 420 or the storage device 430. Execution of the instruction(s) may cause graphical information to be displayed or otherwise presented via a user interface on the I/O device 440. The processor(s) 410 may include the CPU.

The memory 420 may store information within the system 400. In some implementations, the memory 420 is a computer-readable medium. In some implementations, the memory 420 may include one or more volatile memory units. In some implementations, the memory 420 may include one or more non-volatile memory units. The memory 420 may include the hybrid main memory system.

The storage device 430 may be configured to provide mass storage for the system 400. In some implementations, the storage device 430 is a computer-readable medium. The storage device 430 may include a floppy disk device, a hard disk device, an optical disk device, a tape device, or other type of storage device. The I/O device 440 may provide I/O operations for the system 400. In some implementations, the I/O device 440 may include a keyboard, a pointing device, or other devices for data input. In some implementations, the I/O device 440 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
receiving, by an authorization manager of a cloud-platform, a request from an application, the request indicating a query to access personal user data stored securely and in isolation in a database system of the cloud-platform, the database system comprising a plurality of containers in a multi-tenant architecture, each container comprising a tenant database that is specific to and stores personal user data of a respective user and corresponds to a schema, the plurality of containers sharing database system resources, while each container is fully isolated with its own database applications, catalog, repository, persistence, and database services, the personal user data being segmented in a plurality of access levels and the schema being provided based on a scope authorized by the user;
determining, by the authorization manager and based on user input from a user, that access to the personal user data is to be granted, and in response:
providing, by the authorization manager, an access token to approve the application to access the personal user data;
receiving an access request from the application, the access request comprising the access token; and
selectively providing the personal user data of one of the plurality of access levels from a database container of the database system based on the access token, the database container being specific to the user.

2. The method of claim 1, wherein the access token is based on the scope granted to the application by the user.

3. The method of claim 2, wherein the scope defines personal user data that the application is authorized to access.

4. The method of claim 1, wherein the application is executed by an application manager, which executes the application in an isolated operating system environment.

5. The method of claim 1, wherein the application is executed on a computing device of the user, and the access token is stored on the computing device.

6. The method of claim 1, wherein the application is provided read-only access to the personal user data.

7. The method of claim 1, wherein the plurality of containers share system resources of the database system.

8. A non-transitory computer-readable storage medium coupled to one or more processors and having instructions stored thereon which, when executed by the one or more processors, cause the one or more processors to perform operations comprising:
receiving, by an authorization manager of a cloud-platform, a request from an application, the request indicating a query to access personal user data stored securely and in isolation in a database system of the cloud-platform, the database system comprising a plurality of containers in a multi-tenant architecture, each container comprising a tenant database that is specific to and stores personal user data of a respective user and corresponds to a schema, the plurality of containers sharing database system resources, while each container is fully isolated with its own database applications, catalog, repository, persistence, and database services, the personal user data being segmented in a plurality of access levels and the schema being provided based on a scope authorized by the user;
determining, by the authorization manager and based on user input from a user, that access to the personal user data is to be granted, and in response:
providing, by the authorization manager, an access token to approve the application to access the personal user data;
receiving an access request from the application, the access request comprising the access token; and
selectively providing the personal user data of one of the plurality of access levels from a database container of the database system based on the access token, the database container being specific to the user.

9. The non-transitory computer-readable storage medium of claim 8, wherein the access token is based on the scope granted to the application by the user.

10. The non-transitory computer-readable storage medium of claim 9, wherein the scope defines personal user data that the application is authorized to access.

11. The non-transitory computer-readable storage medium of claim 8, wherein the application is executed by an application manager, which executes the application in an isolated operating system environment.

12. The non-transitory computer-readable storage medium of claim 8, wherein the application is executed on a computing device of the user, and the access token is stored on the computing device.

13. The non-transitory computer-readable storage medium of claim 8, wherein the application is provided read-only access to the personal user data.

14. The non-transitory computer-readable storage medium of claim 8, wherein the plurality of containers share system resources of the database system.

15. A system, comprising:
a computing device; and
a computer-readable storage device coupled to the computing device and having instructions stored thereon which, when executed by the computing device, cause the computing device to perform operations comprising:
receiving, by an authorization manager of a cloud-platform, a request from an application, the request indicating a query to access personal user data stored securely and in isolation in a database system of the cloud-platform, the database system comprising a plurality of containers in a multi-tenant architecture, each container comprising a tenant database that is specific to and stores personal user data of a respective user and corresponds to a schema, the plurality of containers sharing database system resources, while each container is fully isolated with its own database applications, catalog, repository, persistence, and database services, the personal user data being segmented in a plurality of access levels and the schema being provided based on a scope authorized by the user;
determining, by the authorization manager and based on user input from a user, that access to the personal user data is to be granted, and in response:
providing, by the authorization manager, an access token to approve the application to access the personal user data;

receiving an access request from the application, the access request comprising the access token; and selectively providing the personal user data of one of the plurality of access levels from a database container of the database system based on the access token, the database container being specific to the user.

16. The system of claim 15, wherein the access token is based on the scope granted to the application by the user.

17. The system of claim 16, wherein the scope defines personal user data that the application is authorized to access.

18. The system of claim 15, wherein the application is executed by an application manager, which executes the application in an isolated operating system environment.

19. The system of claim 15, wherein the application is executed on a computing device of the user, and the access token is stored on the computing device.

20. The system of claim 15, wherein the application is provided read-only access to the personal user data.

* * * * *